(12) United States Patent
De Lima Junior

(10) Patent No.: US 10,169,076 B2
(45) Date of Patent: Jan. 1, 2019

(54) DISTRIBUTED BATCH JOB PROMOTION WITHIN ENTERPRISE COMPUTING ENVIRONMENTS

(71) Applicant: International Business Machines Corporation, Armonk, NY (US)

(72) Inventor: Juscelino Candido De Lima Junior, Sao Paolo (BR)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 14/221,424

(22) Filed: Mar. 21, 2014

(65) Prior Publication Data

US 2015/0268986 A1    Sep. 24, 2015

(51) Int. Cl.
G06F 9/48    (2006.01)

(52) U.S. Cl.
CPC ................... G06F 9/4843 (2013.01)

(58) Field of Classification Search
CPC .................................................. G06F 9/4843
USPC ........................................................ 717/101
See application file for complete search history.

(56) References Cited

U.S. PATENT DOCUMENTS 5,210,866 A * 5/1993 Milligan ............. G06F 11/1451
714/6.12
7,467,198 B2   12/2008 Goodman et al.
8,347,402 B2   1/2013  Imrey et al.
8,380,665 B2   2/2013  Papadomanolakis et al.
8,468,527 B2   6/2013  Rai
(Continued)

FOREIGN PATENT DOCUMENTS

WO    2008080523 A1    7/2008
WO    2009082653 A1    7/2009

OTHER PUBLICATIONS

Author Unknown, "Job Scheduling Overview / ActiveBatch Job Scheduler", http://www.advsyscon.com/home/products/activebatch/overview.aspx, accessed on Mar. 14, 2014, pp. 1-3.
(Continued)

*Primary Examiner* — Li B. Zhen
*Assistant Examiner* — Bradford F Wheaton
(74) *Attorney, Agent, or Firm* — L. Jeffrey Kelly

(57) ABSTRACT

A computer-implemented method for batch code promotion between enterprise scheduling system environments is provided. The computer-implemented method comprises connecting a graphical interface of an entity to one or more enterprise scheduling environments for promoting changes of batch code of the entity between the one or more enterprise scheduling environments. The computer-implemented method further comprises mapping parameters to batch code fields of the batch code that changes between a first scheduling level of the one or more enterprise scheduling environments to a second scheduling level of the one or more enterprise scheduling environments. The computer-implemented method comprises assigning identification to the changes of the batch code fields. The computer implemented method comprises promoting the requested identified changes from the first scheduling level to the second scheduling level using the mapped parameters of the first scheduling level and the second scheduling level.

12 Claims, 5 Drawing Sheets

(56) References Cited

U.S. PATENT DOCUMENTS

| | | | | |
|---|---|---|---|---|
| 8,677,315 B1* | 3/2014 | Anderson | ................. | G06F 8/60 |
| | | | | 717/101 |
| 2005/0283667 A1* | 12/2005 | Batten | ................. | G06F 11/3672 |
| | | | | 714/25 |
| 2006/0190476 A1* | 8/2006 | Mettovaara | ....... | G06F 17/30297 |
| | | | | 707/102 |
| 2009/0241117 A1 | 9/2009 | Dasgupta et al. | | |
| 2011/0099326 A1* | 4/2011 | Jung | ................. | G06F 12/0246 |
| | | | | 711/103 |
| 2011/0099387 A1* | 4/2011 | Gremaud | ............ | G06F 12/1408 |
| | | | | 713/190 |
| 2011/0099549 A1* | 4/2011 | Sriraghavan | ......... | G06Q 10/109 |
| | | | | 718/100 |
| 2012/0005597 A1* | 1/2012 | Eberlein | ............... | G06F 9/4881 |
| | | | | 715/751 |
| 2013/0252643 A1* | 9/2013 | Park | ........................ | H04W 8/24 |
| | | | | 455/458 |

OTHER PUBLICATIONS

Cisco Data Sheet, Cisco Tidal Enterprise Adapter for Web Services, c78-702608-00, Mar. 2012, pp. 1-4.

IBM, "Best Practices InfoSphere MDM Server in the Enterprise", Team Development: Managing and Promoting Software Changes, IBM® InfoSphere™ MDM Server, pp. 1-34.

Bourn et al., "Metadata Promotion in SAS® 9.2", Paper 331-2008, pp. 1-9.

Author Unknown, "Simplifying Batch Scheduling", www.JAMSScheduler.com, MVP Systems Software, pp. 1-4.

* cited by examiner

DISTRIBUTED BATCH JOB PROMOTION WITHIN ENTERPRISE COMPUTING ENVIRONMENTS

FIELD OF THE INVENTION

The present invention relates to generally to batch job processing of computing systems, and more particularly to, distributed batch job promotion within enterprise computing environments, for production control of processed batch jobs.

BACKGROUND

Batch jobs are application processes that are executed by a computer system, off-line, in motion (e.g., not in real time). Batch jobs are also generally queued, or accumulated during peaks hours, when computing resources are unavailable, or constrained by real-time activities of an organization or an enterprise of the batch jobs. Batch jobs can be also be executed during non-peak or idle hours, when computing resources are available, or less constrained.

Batch jobs are also generally stored in an input file, also known a batch file, command file, or shell script, wherein the input file is executed by the computer system. Execution of the input file may produce a number of actions, including, updating databases, reconciliation of financial transactions, sending emails to users, or producing one or more output files, for utilization of batch jobs. Most batch jobs access databases to get information needed to perform their function. The execution priority order and frequency of queued or accumulated batch jobs is generally managed by a batch scheduler. Further, the organization, or the enterprise may execute its own batch jobs using a standalone batch processing computer system, or batch server pool that includes plural servers for processing the input files of the batch jobs. Moreover, workload automation of a batch processing computing system, or batch server, automates repetitive tasks and manages workloads of batch jobs on many platforms, for batch job processing, across virtual, physical, and cloud environments.

SUMMARY

In one embodiment, a computer-implemented method for batch code promotion between enterprise scheduling system environments is provided. The computer-implemented method comprises connecting, by one or more processors, a graphical interface of an entity to one or more enterprise scheduling environments for promoting changes of batch code of the entity between the one or more enterprise scheduling environments. The computer-implemented method further comprises mapping, by the one or more processors, parameters to batch code fields of the batch code that changes between a first scheduling level of the one or more enterprise scheduling environments to a second scheduling level of the one or more enterprise scheduling environments to create a mapping table to the batch code fields that changes from the first scheduling level and the second scheduling level. The computer-implemented method further comprises in response to an action on the graphical interface to promote the changes of the batch code fields between the mapped parameters of the first scheduling level and the second scheduling level, assigning, by the one or more processors, identification to the changes of the batch code fields. The computer-implemented method further comprises in response to a request to promote the identified changes of the batch code fields, promoting, by the one or more processors, the requested identified changes from the first scheduling level to the second scheduling level using the mapped parameters of the first scheduling level and the second scheduling level.

In another embodiment, a computer system for batch code promotion between enterprise scheduling system environments, the computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to connect a graphical interface of an entity to one or more enterprise scheduling environments for promoting changes of batch code of the entity between the one or more enterprise scheduling environments. The computer system further comprises program instructions to map parameters to batch code fields of the batch code that changes between a first scheduling level of the one or more enterprise scheduling environments to a second scheduling level of the one or more enterprise scheduling environments to create a mapping table to the batch code fields that changes from the first scheduling level and the second scheduling level. The computer system further comprises program instructions to assign identification to the changes of the batch code fields in response to an action on the graphical interface to promote the changes of the batch code fields between the mapped parameters of the first scheduling level and the second scheduling level. The computer system further comprises program instructions to promote the requested identified changes from the first scheduling level to the second scheduling level using the mapped parameters of the first scheduling level and the second scheduling level in response to a request to promote the identified changes of the batch code fields.

In yet another embodiment, a computer program product for batch code promotion between enterprise scheduling system environments, the computer program product comprising: one or more computer-readable tangible storage devices and program instructions stored on at least one of the one or more storage devices. The computer program product comprises program instructions to connect a graphical interface of an entity to one or more enterprise scheduling environments for promoting changes of batch code of the entity between the one or more enterprise scheduling environments. The computer program product further comprises program instructions to map parameters to batch code fields of the batch code that changes between a first scheduling level of the one or more enterprise scheduling environments to a second scheduling level of the one or more enterprise scheduling environments to create a mapping table to the batch code fields that changes from the first scheduling level and the second scheduling level. The computer program product further comprises program instructions to assign identification to the changes of the batch code fields in response to an action on the graphical interface to promote the changes of the batch code fields between the mapped parameters of the first scheduling level and the second scheduling level. The computer program product further comprises program instructions to promote the requested identified changes from the first scheduling level to the second scheduling level using the mapped parameters of the first scheduling level and the second scheduling level in response to a request to promote the identified changes of the batch code fields.

BRIEF DESCRIPTION OF THE SEVERAL VIEWS OF THE DRAWINGS

Novel characteristics of the invention are set forth in the appended claims. The invention will best be understood by reference to the following detailed description of the invention when read in conjunction with the accompanying figures, wherein like reference numerals indicate like components, and:

DETAILED DESCRIPTION

Figure 1:
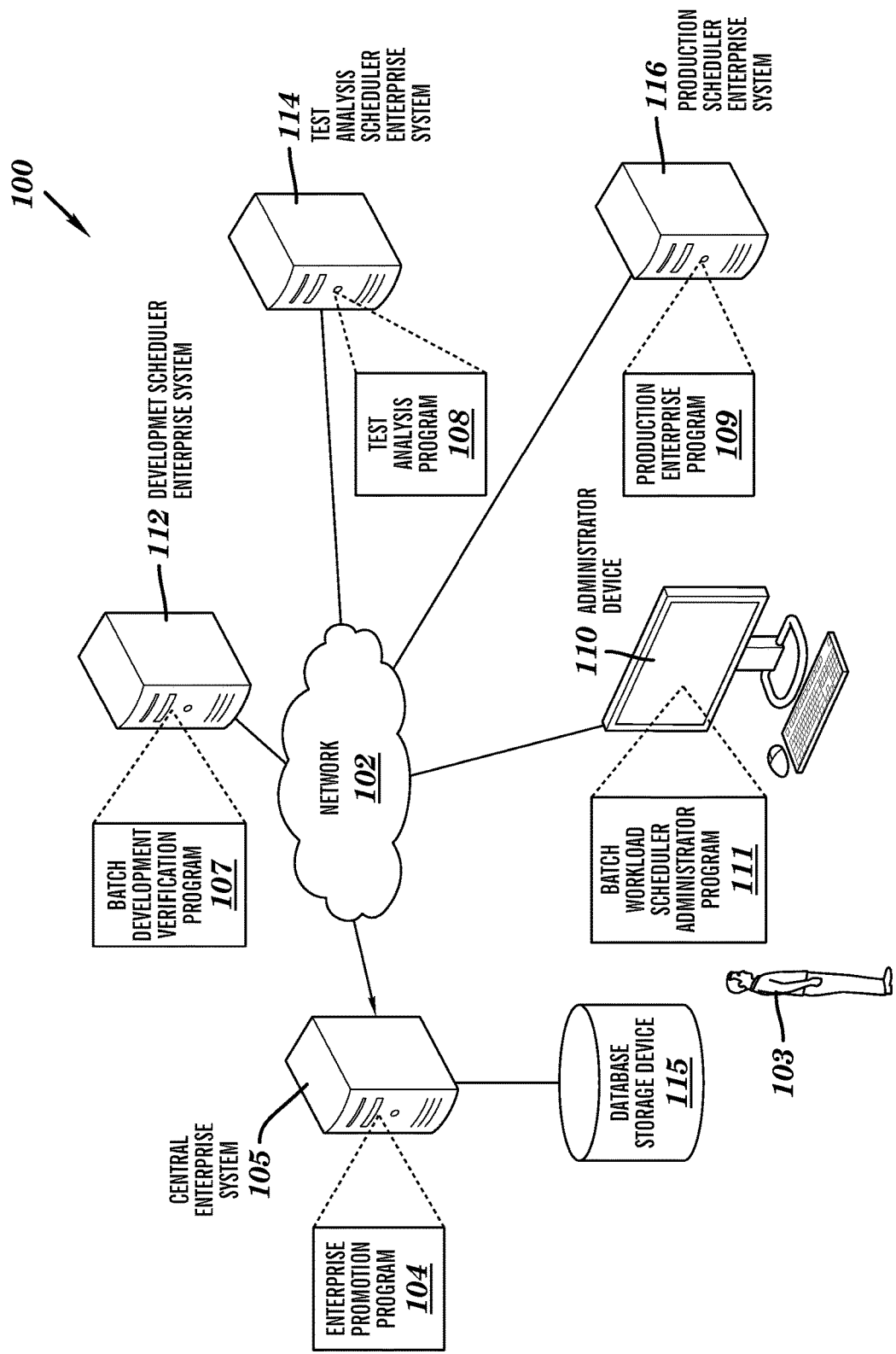
FIG. 1 is a functional block diagram of a batch job promotion environment for performing automated promotion of batch job scheduling objects of batch jobs between enterprise scheduling environments of the batch job promotion environment, in accordance with embodiments of the present invention.

A batch job is a scheduled program that automates system tasks, or schedules that needs to be performed on a regular basis in a server computing system. Batch jobs can be defined to specific operating systems that are usually bound to a particular resource, such as, a database or data set that is executed in the server computing system. Batch jobs that need to be processed on a regular basis are incorporated into batch job scheduling objects.

A batch job scheduling object is the resource that represents a schedule, stream, or batch process of the batch job. The batch job scheduling object can include a container for all batch jobs, running from a same schedule. For example, if you have a set of batch jobs that run sequentially from a schedule that updates all files nightly for a medical records application, you would define the set of batch jobs, as batch job scheduling objects. Thus, in this scenario, the batch job scheduling objects can be named, or identified, the "MRFU" batch job scheduling objects, to indicate "Medical Records Files Update". In general, an administrator determines which batch job scheduling object should be monitored. After that determination is made, the administrator creates the batch job scheduling object within the server computing system, for identification, and processing.

A batch job can also be a low priority job that can operate in special enterprise computing environments, including, job scheduler environments. For example, the job scheduler environments can provide a graphical user interface, and a single point of control for definition, and monitoring of program executions of the batch job scheduling object in a distributed network of enterprise server computers. The job scheduler environments can also be enterprise processing systems that control program processing, monitoring, analyzing, or execution of the batch job scheduling object within the job scheduler environment.

For example, entities that operate batch job scheduling objects usually provide job scheduling environments, including, for example, a development enterprise, a test enterprise environment, or a production enterprise environment, for monitoring background program processing, analyzing, or execution of the batch job scheduling objects of batch jobs. Consider, for example, an administrator, or a production support analyst of the entity, receives a request from the entity to perform verification of job flow of the batch job within a development analysis scheduler enterprise environments of the job scheduling environments.

After the administrator performs the verification phase of the of the job flow on the development scheduler enterprise environments, the same request is typically received by the administrator to perform a similar, or the same verification of the job flow within a test-analysis scheduler enterprise environments, or a production scheduler enterprise environments of the job scheduling environments. However, in general, the administrator manually performs the same analysis of the verification phase of the job from, for example, the development scheduler enterprise environments, to either of the test-analysis scheduler enterprise environments, or the production scheduler enterprise environments. Manual promotion of the batch jobs within the job scheduling environments can cause delays in job promotions within the job scheduling environments, high potential for errors during the batch job promotion, or slower disaster control of the batch jobs within the job scheduling environments. The present invention comprises a computer-implemented method, system, and computer program product for analyzing batch job scheduling objects, within job scheduling environments, wherein the analyzed batch job scheduling objects are automatically promoted between the job scheduling environments, without manual intervention, as described in further details below.

Consider, for example, development scheduler enterprise environments of the job scheduling environments creates batch job scheduling objects of the batch jobs. Further, once the created batch scheduling objects are verified for processing by the development scheduler enterprise environments, the batch job scheduling objects are automatically transmitted to test-analysis scheduler enterprise environments of job scheduling environments, wherein the test-analysis scheduler enterprise environments verifies behavior of the batch job scheduling objects. Further, once verification of behavior of the batch job scheduling objects is complete, the verified batch scheduling objects are automatically promoted to production scheduler enterprise environments, wherein production scheduler enterprise environments performs systems operations of the batch job scheduling objects.

The present invention will now be described in detail with reference to the accompanying Figures. Referring now to FIG. 1, batch job promotion environment 100 for performing automated promotion of batch job scheduling objects of batch jobs between enterprise scheduling environments of batch job promotion environment 100, is shown. The enterprise scheduling environments can be, for example, development scheduler enterprise environments, test-analysis scheduler enterprise environments, or production scheduler enterprise environments, for analyzing the batch job scheduling objects, and automatically promoting the analyzed batch job scheduling objects between the enterprise scheduling environments. According to at least one embodiment, automatic promotion of the batch job scheduling objects can be based on a request to promote the batch job scheduling objects within batch job promotion environment 100.

Batch job promotion environment 100 includes administrator device 110, development scheduler enterprise system 112, test-analysis scheduler enterprise system 114, production scheduler enterprise system 116, and central enterprise system 105 which includes database device 115, all interconnected over network 102.

Administrator device 110 can be, for example, a laptop, tablet, or notebook personal computer (PC), a desktop computer, a mainframe or mini computer, a personal digital assistant (PDA), or a smart phone. Administrator device 110 includes batch workload scheduler administrator program 111. Batch workload scheduler administrator program 111 can be any type of system application that provides an application interface for promotion of batch job scheduling objects, between each one of development scheduler enterprise system 112, test-analysis scheduler enterprise system 114, production scheduler enterprise system 116, wherein the batch job scheduling objects are analyzed, and automatically promoted between development scheduler enterprise system 112, test-analysis scheduler enterprise system 114, production scheduler enterprise system 116, without manual intervention.

For example, administrator 103 creates batch job scheduling objects in development scheduler enterprise system 112. Once the batch job scheduling objects are verified for processing by development scheduler enterprise system 112, the batch job scheduling objects are automatically migrated to test-analysis scheduler enterprise system 114 for verification of behavior of the batch job scheduling objects and, once verification of behavior of the batch job scheduling objects is complete, the verified batch job scheduling objects is further automatically promoted to production scheduler enterprise system 116, wherein production scheduler enterprise system 116 performs systems operations of the batch job scheduling objects for verification of batch scheduling resources that represents a schedule, stream, or batch processes of the batch job scheduling objects within batch job promotion environment 100.

The created, verified, and operated batch job scheduling objects are directly promoted between each one of development scheduler enterprise system 112, test-analysis scheduler enterprise system 114, or production scheduler enterprise system 116, by batch workload scheduler administrator program 111, or alternatively, in another embodiment, the batch job scheduling objects can be promoted to each one of development scheduler enterprise system 112, test-analysis scheduler enterprise system 114, or production scheduler enterprise system 116 by central enterprise system 105, as depicted in FIG. 1. For example, once the created batch job scheduling objects are verified for processing by development scheduler enterprise system 112, administrator 103 can optionally select, in batch workload scheduler administrator program 111, to automatically promote the verified batch job scheduling objects between either of test-analysis scheduler enterprise system 114, or production scheduler enterprise system 116, for further verification, and processing of the batch job scheduling objects.

Central enterprise system 105 can be, a central mainframe server system such as a management server, a web server, or any other electronic device, or central computing server system that is capable of receiving and sending data and, also, serving as an intersection for promoting and, deploying, created, verified and operated batch job scheduling objects, between each one of development scheduler enterprise system 112, test-analysis scheduler enterprise system 114, or production scheduler enterprise system 116.

Central enterprise system 105 can also represent a "cloud" of computers interconnected by one or more networks, wherein central enterprise system 105 is a primary server for a computing system utilizing clustered computers when accessed through network 102. For example, a cloud computing system can be an implementation of an integrated system tool that provides a facility to perform automated promotion of batch job scheduling objects between enterprise scheduling environments of batch job promotion environment 100. Central enterprise system 105 includes enterprise promotion program 104. Enterprise promotion program 104 receives created, verified, or operated batch job scheduling objects of either one of development scheduler enterprise system 112, tests analysis scheduler enterprise system 114, production scheduler enterprise system 116, and automatically transmits the batch job scheduling objects between development scheduler enterprise system 112, test-analysis scheduler enterprise system 114, or production scheduler enterprise system 116.

Database storage device 115 is any type of storage device, storage server, storage area network, redundant array of independent discs (RAID), cloud storage service, or any type of data storage that stores changes to created, verified and operated batch job scheduling objects, for deploying and promotion of the created, verified and operated batch job scheduling objects to either one of development scheduler enterprise system 112, test-analysis scheduler enterprise system 114, or production scheduler enterprise system 116. For example, once the batch schedules are created in development scheduler enterprise system 112, the batch schedules are transmitted to enterprise promotion program 104 by batch code administrator program 111.

For example, enterprise promotion program 104 stores the created batch job scheduling objects in database storage device 115 for automatic promotion, and transmission of the created and stored batch job scheduling objects of development scheduler enterprise system 112, between either of test-analysis scheduler enterprise system 114, or production scheduler enterprise system 116, in response to a request by batch workload scheduler administrator program 111 to promote the stored batch job scheduling objects between either of test-analysis scheduler enterprise system 114 or production scheduler enterprise system 116. For instance, request by administrator 103 to promote the stored batch job scheduling objects of database storage device 115 is monitored, by batch workload scheduler administrator program 111, periodically, randomly, and/or using event-based monitoring.

Each one of development scheduler enterprise system 112, test-analysis scheduler enterprise system 114, and production scheduler enterprise system 116 can be a mainframe server system such as a management server, a web server, or any other electronic device or central computing server system that is capable of receiving and sending data. Additionally, each one of development scheduler enterprise system 112, test-analysis scheduler enterprise system 114, and production scheduler enterprise system 116 can include a database storage system for storing created batch job scheduling objects, transmitted by enterprise promotion program 104. Development scheduler enterprise system 112 includes batch development verification program 107, which creates batch job scheduling objects of batch job promotion environment 100. Test-analysis scheduler enterprise system 114 includes test-analysis program 108, which verifies behavior of the created batch job scheduling objects. Production scheduler enterprise system 116 includes production enterprise program 109, which executes program operations of the created and verified batch job scheduling objects within batch job promotion environment 100.

Network 102 includes one or more networks of any kind that can provide communication links between various devices and computers connected together within batch job promotion environment 100. Network 102 can also include connections, such as wired communication links, wireless communication links, or fiber optic cables. Network 102 can also be implemented as a number of different types of networks, including, for example, a local area network (LAN), wide area network (WAN) or a packet switched telephone network (PSTN), or some other networked system. For example, batch job promotion environment 100 can utilize the Internet with network 102 representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

Figure 2:
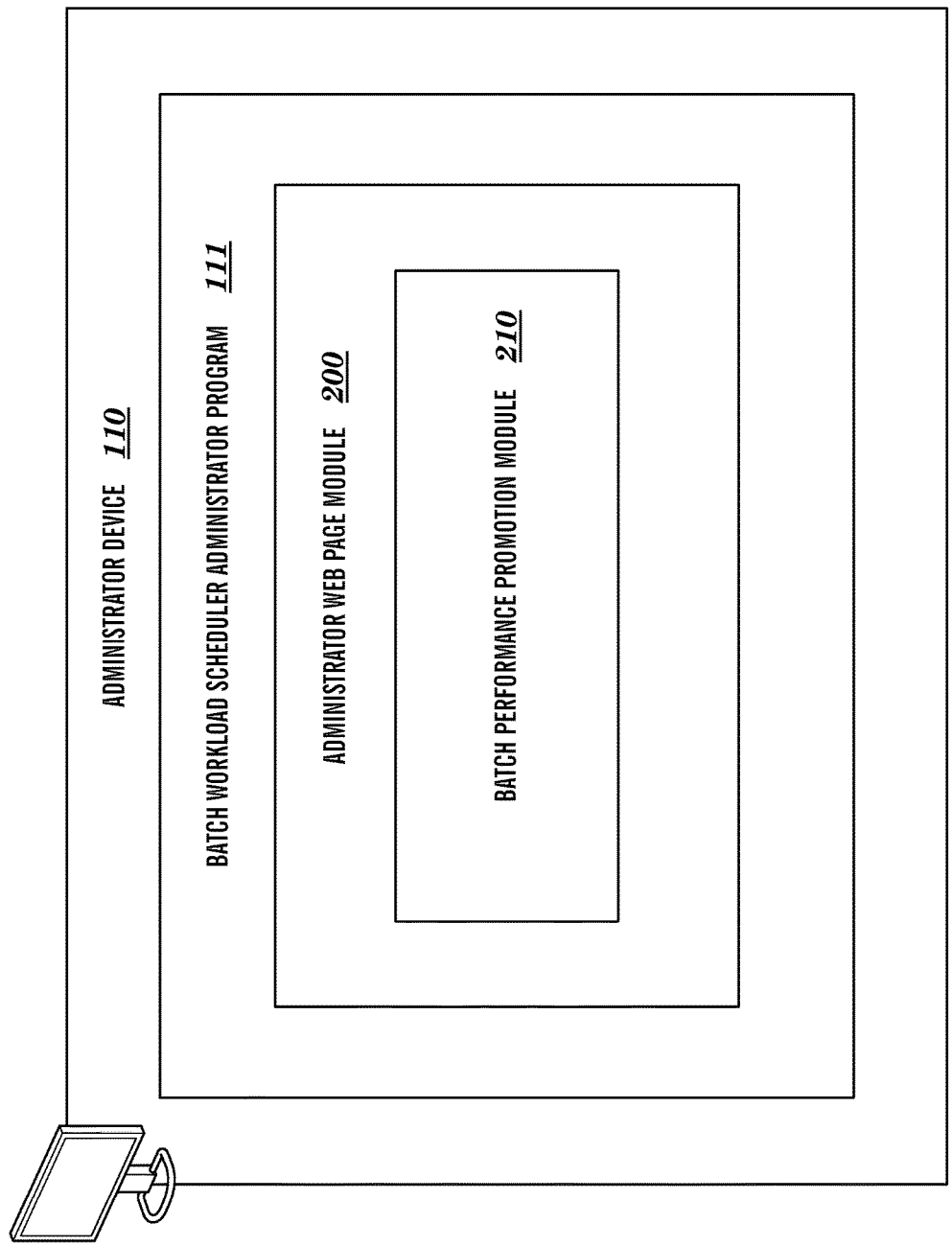
FIG. 2 is a functional block diagram illustrating program components of an administrator device, in accordance with embodiments of the present invention.

FIG. 2 is a functional block diagram illustrating program components of administrator device 110. Batch workload scheduler administrator program 111 can, among other things, retrieve and display content accessible via network 102, such as web pages, web server application systems, or mainframe workstation scheduler monitoring applications, during dynamic system promotion of batch job scheduling objects between development scheduler enterprise system 112, test-analysis scheduler enterprise system 114, or production scheduler enterprise system 116 of batch job promotion environment 100.

Batch workload scheduler administrator program 111 can be, for example, a web server scheduling browser system application for processing batch jobs of batch job promotion environment 100, wherein the batch jobs are processed on regular basis, and incorporated into batch job scheduling objects. For example, batch workload scheduler administrator program 111 executes, and tracks the batch job scheduling objects for scheduling batch code verification analyses between development scheduler enterprise system 112, test-analysis scheduler enterprise system 114, and production scheduler enterprise system 116. Batch workload scheduler administrator program 111 includes administrative web page module 200. Administrative web page module 200 is a web browser plugin/add-on that extends the functionality of batch workload scheduler administrator program 111 by adding additional user interface elements to batch workload scheduler administrator program 111.

Administrative web page module 200 includes batch performance promotion module 210, which is received in administrative web page module 200 from enterprise promotion program 104 for providing an interface for promoting batch job scheduling objects between within batch job promotion environment 100. Batch performance promotion module 210 can include program code, such as, Hypertext Markup Language (HTML) code or JavaScript code that, when executed, adds one or more user interface elements to batch workload scheduler administrator program 111 for promoting the batch job scheduling objects.

For example, administrator 103 can, request, in batch performance promotion module 210, to promote, created, confirmed changes of batch job scheduling objects of development scheduler enterprise system 112, between either one of test-analysis scheduler enterprise system 114, or production scheduler enterprise system 116. As described, once the created batch job scheduling objects of development scheduler enterprise system 112 are confirmed, the created batch job scheduling objects are automatically promoted by enterprise promotion program 104, to test-analysis program 108 for verification of behavior of batch job scheduling objects and, once verification of behavior of the batch job scheduling objects is complete, the verified batch job scheduling objects is further automatically promoted, by enterprise promotion program 104, to production enterprise program 109, wherein production enterprise program 109 performs systems operations of the batch job scheduling objects for verification of batch scheduling resources that represents a schedule, stream, or batch processes of the batch jobs within batch job promotion environment 100, in accordance with the present invention.

Figure 3:
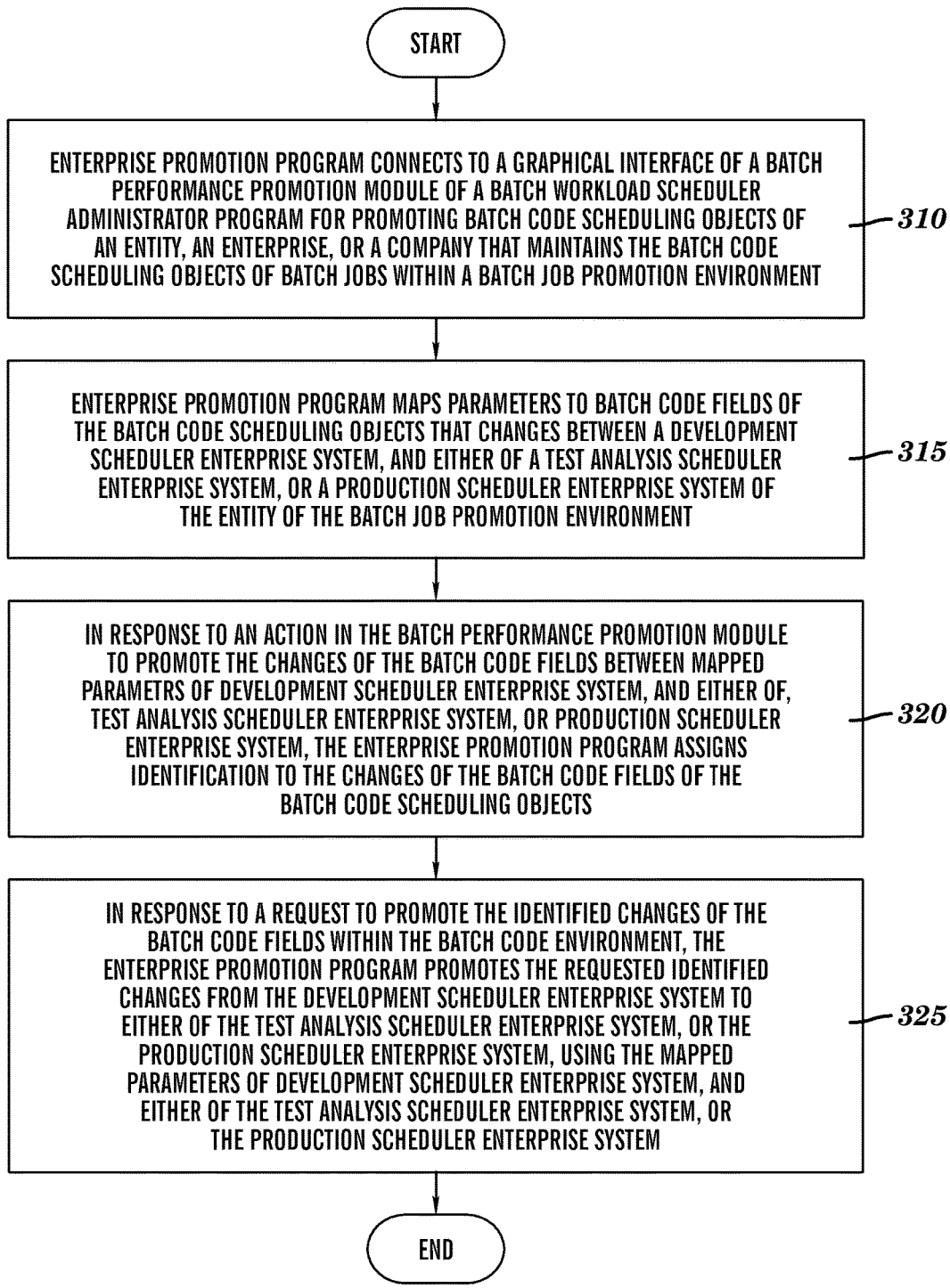
FIG. 3 is a flow diagram depicting steps performed by an enterprise promotion program for promoting batch job scheduling objects of batch jobs between a development scheduler enterprise system, a test-analysis scheduler enterprise system, and a production scheduler enterprise system, in accordance with embodiments of the present invention.

FIG. 3 is a flow diagram depicting steps performed by enterprise promotion program 104 for promoting batch job scheduling objects between development scheduler enterprise system 112, test-analysis scheduler enterprise system 114, or production scheduler enterprise systems 116, in accordance with embodiments of the present invention.

Enterprise promotion program 104 connects to a graphical interface of batch performance promotion module 210, for promoting batch job scheduling objects of an entity, an enterprise, or a company that maintains the batch job scheduling objects of batch jobs within batch job promotion environment 100, wherein promotion of the batch job scheduling objects is performed between each one of development scheduler enterprise system 112, test-analysis scheduler enterprise system 114, or production scheduler enterprise system 116. (Step 310). For instance, administrator 103 creates batch job scheduling objects in development scheduler enterprise system 112.

Further, once the batch job scheduling objects are verified for processing by development scheduler enterprise system 112, a record of the created batch schedules is stored in database storage device 115 for future retrieval, and processing, by either of test-analysis scheduler enterprise system 114, or production scheduler enterprise system 116, in accordance with embodiments of the present invention.

For example, the batch job scheduling objects are identified, retrieved, and automatically transmitted by enterprise promotion program 104 to test-analysis scheduler enterprise system 114, for verification of behavior of the batch job scheduling objects and, once verification of behavior of the batch job scheduling objects is complete, the verified batch job scheduling objects is further automatically promoted to production scheduler enterprise system 116, by enterprise promotion program 104, wherein production scheduler enterprise system 116 performs systems operations of the batch job scheduling objects for verification of batch scheduling resources of batch job promotion environment 100. For example, enterprise promotion program 104 maps parameters to batch code fields of the batch job scheduling objects that changes between development scheduler enterprise system 112 and, either of test-analysis scheduler enterprise system 114, or production scheduler enterprise system 116, to create a mapping table to the batch code fields of the batch job scheduling objects, between development scheduler enterprise system 112, and either of test-analysis scheduler enterprise system 114, or production scheduler enterprise system 116 of batch job promotion environment 100. (Step 315).

The parameters to the batch code fields that change between the development scheduler enterprise system 112 and either of test-analysis scheduler enterprise system 114, or production scheduler enterprise system 116 includes at least one of identification of the batch job scheduling objects of development scheduler enterprise system 112. Further, the mapping table of changed batch code fields of development scheduler enterprise system 112 and the mapping table of changed batch code fields of either test-analysis scheduler enterprise system 114, or production scheduler enterprise system 116, is correlated, wherein the correlated mapping table of the changed batch code fields includes metadata of created, verified, and operated batch job scheduling objects, for each one of development scheduler enterprise system 112, and either of test-analysis scheduler enterprise system 114, or production scheduler enterprise system 116. The metadata of the batch code for each one of test-analysis scheduler enterprise system 114, and production scheduler enterprise systems 116, is identified for promoting changes of the batch code fields from development scheduler enterprise system 112 to either of test-analysis scheduler enterprise system 114 or production scheduler enterprise system 116.

Further, in response to an action in batch performance promotion module 210 to promote the changes of the batch code fields between mapped parameters of development scheduler enterprise system 112, and either of, test-analysis scheduler enterprise system 114, or production scheduler enterprise system 116, enterprise promotion program 104 assigns identification to the changes of the batch code fields of the batch job scheduling objects. (Step 320). Moreover, in response to a request to promote the identified changes of the batch code fields within batch code environment 100, enterprise promotion program 104 promotes the requested identified changes from development scheduler enterprise system 112, to either of test-analysis scheduler enterprise system 114, or production scheduler enterprise system 116, using the mapped parameters of development scheduler enterprise system 112, and test-analysis scheduler enterprise system 114, or production scheduler enterprise system 116. (Step 325).

Figure 4:
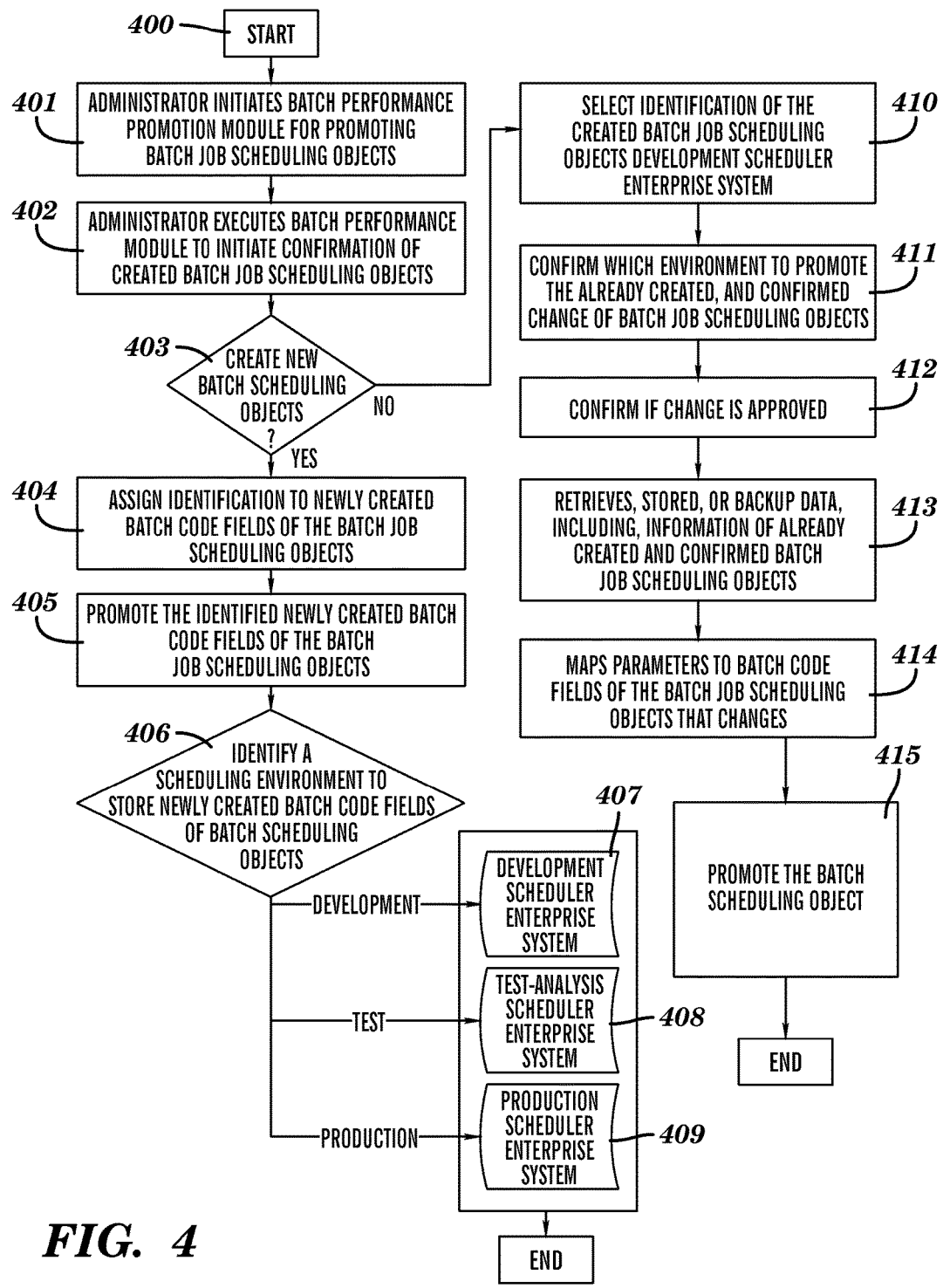
FIG. 4 is a flow diagram depicting steps of another embodiment for batch code promotion between a development scheduler enterprise system, a test-analysis scheduler enterprise system, and a production scheduler enterprise system, in accordance with embodiments of the present invention.

FIG. 4 is a flow diagram depicting steps of another embodiment for batch code promotion between development scheduler enterprise system 112, test-analysis scheduler enterprise system 114, or production scheduler enterprise systems 116, in accordance with embodiments of the present invention. The flow diagram starts at 400. Administrator 103, or user of batch job promotion environment 100 initiates, or logs into batch performance promotion module 210 for execution of program instructions for promoting batch job scheduling objects of batch jobs, processed within batch job promotion environment 100, and promoted between either of development scheduler enterprise system 112, test-analysis scheduler enterprise system 114, or production scheduler enterprise systems 116. (Step 401).

For example, administrator 103 executes batch performance promotion module 210 to initiate confirmation of created batch job scheduling objects in, for example, development scheduler enterprise system 112. (Step 402). At decision 403, administrator 103 determines, in batch performance promotion module 210, whether created, confirmed, and existing batch job scheduling objects should be promoted between either of test-analysis scheduler enterprise system 114, or production scheduler enterprise systems 116, for verification of behavior of the batch job scheduling object, or whether to create another newly processed batch job scheduling objects for promotion of the created batch job scheduling objects, between either of test-analysis scheduler enterprise system 114, or production scheduler enterprise systems 116.

If it is determined, in batch performance promotion module 210, to promote a new changes of the batch job scheduling object between either of test-analysis scheduler enterprise system 114, or production scheduler enterprise systems 116, then at step 404, in response to an action by administrator 103, in batch performance promotion module 210 to promote a new creation of the batch job scheduling objects between development scheduler enterprise system 112, and either of, test-analysis scheduler enterprise system 114, or production scheduler enterprise system 116, enterprise promotion program 104 assigns identification to newly created batch code fields of the batch job scheduling objects. For example, in response to an action log by administrator 103, in batch performance promotion module 210, to promote the newly created batch code fields of the batch job scheduling objects between either of test-analysis scheduler enterprise system 114, or production scheduler enterprise systems 116, at step 405, administrator 103 initiates a user, or administrative log to promote the identified newly created batch code fields of the batch job scheduling objects between either of test-analysis scheduler enterprise system 114, or production scheduler enterprise systems 116. As described, each one of development scheduler enterprise system 112, test-analysis scheduler enterprise system 114, and production scheduler enterprise system 116 can include a database storage system for storing newly created batch code fields of the batch job scheduling objects.

At decision 406, enterprise system program 104 identifies an enterprise scheduling environment within batch job promotion environment 100 to store the newly created batch code fields of the batch scheduling objects, which was edited, or created by administrator 103. For example, if the batch job scheduling objects are created in development scheduler enterprise system 112, then at step 407, batch performance promotion module 210 stores the newly created batch code fields of the batch scheduling objects in a database of development scheduler enterprise system 112. At step 408, the newly created batch code fields of the batch scheduling objects changes are retrieved from development scheduler enterprise system 112, and transmitted to test-analysis scheduler enterprise system 114 for verification of behavior, and validation of parameters, of the batch job scheduling objects.

Once verification of behavior of the batch job scheduling objects is completed, at step 409, the verified batch job scheduling objects is further verified, by enterprise system program 104, in production scheduler enterprise system 116, wherein production scheduler enterprise system 116 performs systems operations of the batch job scheduling objects for verification of batch scheduling resources that represents a schedule, stream, or batch processes of the batch job scheduling objects within batch job promotion environment 100. In this case, promotion of the newly created batch code fields is complete. Thus, the process of promoting new changes of the batch job scheduling objects between either of test-analysis scheduler enterprise system 114, or production scheduler enterprise systems 116 ends.

However, if it is determined, at decision 403, to promote already created, and confirmed batch job scheduling objects of development scheduler enterprise system 112, between either of test-analysis scheduler enterprise system 114, or production scheduler enterprise systems 116, for verification of behavior of the batch job scheduling objects, at step 410, administrator 103 selects, in batch performance promotion module 210, identification of the created batch job scheduling objects of development scheduler enterprise system 112 to be promoted, wherein the batch job scheduling objects are retrieved, and confirmed to be promoted between subsequent environments, of either, test-analysis scheduler enterprise system 114, or production scheduler enterprise systems 116. Further, batch performance promotion module 210 confirms which environment to promote the already created, and confirmed change of batch job scheduling objects of development scheduler enterprise system 112, for example, a determination is made whether the change should be promoted to either of test-analysis scheduler enterprise system 114, or production scheduler enterprise systems 116. (Step 411). Batch performance promotion module 210 further confirms if the confirmed change of the batch job scheduling objects of development scheduler enterprise system 112 is approved for promotion by enterprise system program 104. (Step 412).

Enterprise system program 104 retrieves, stored, or backup data, including, information of already created and confirmed batch job scheduling objects that are stored in development scheduler enterprise system 112, for promotion between either of test-analysis scheduler enterprise system 114, or production scheduler enterprise systems 116. (Step 413). Enterprise promotion program 104 maps parameters to batch code fields of the batch job scheduling objects that changes between development scheduler enterprise system 112 and either of test-analysis scheduler enterprise system 114, or production scheduler enterprise system 116, to create a mapping table to the batch code fields of the already created batch code scheduling objects between development scheduler enterprise system 112 and either of test-analysis scheduler enterprise system 114, or production scheduler enterprise system 116. (Step 414).

As described, in response to an action on batch performance promotion module 210 to promote the already created, and confirmed batch job scheduling objects of development scheduler enterprise system 112 between mapped parameters of test-analysis scheduler enterprise system 114, or production scheduler enterprise system 116, enterprise promotion program 104 assigns identification to the changes of batch code fields of the batch scheduling objects of the already created, and confirmed batch job scheduling objects.

Further, in response to a request to promote the identified changes of the batch code fields between development scheduler enterprise system 112, and test-analysis scheduler enterprise system 114, or production scheduler enterprise system 116, at step 415, the requested identified changes are promoted from development scheduler enterprise system 112 to either of test-analysis scheduler enterprise system 114, or production scheduler enterprise system 116, wherein promotion of the identified changes is finalized an stored in a database of either test-analysis scheduler enterprise system 114, or production scheduler enterprise system 116. Thus, the process of promoting new changes of the batch job scheduling objects between either of test-analysis scheduler enterprise system 114, or production scheduler enterprise systems 116 ends.

Figure 5:
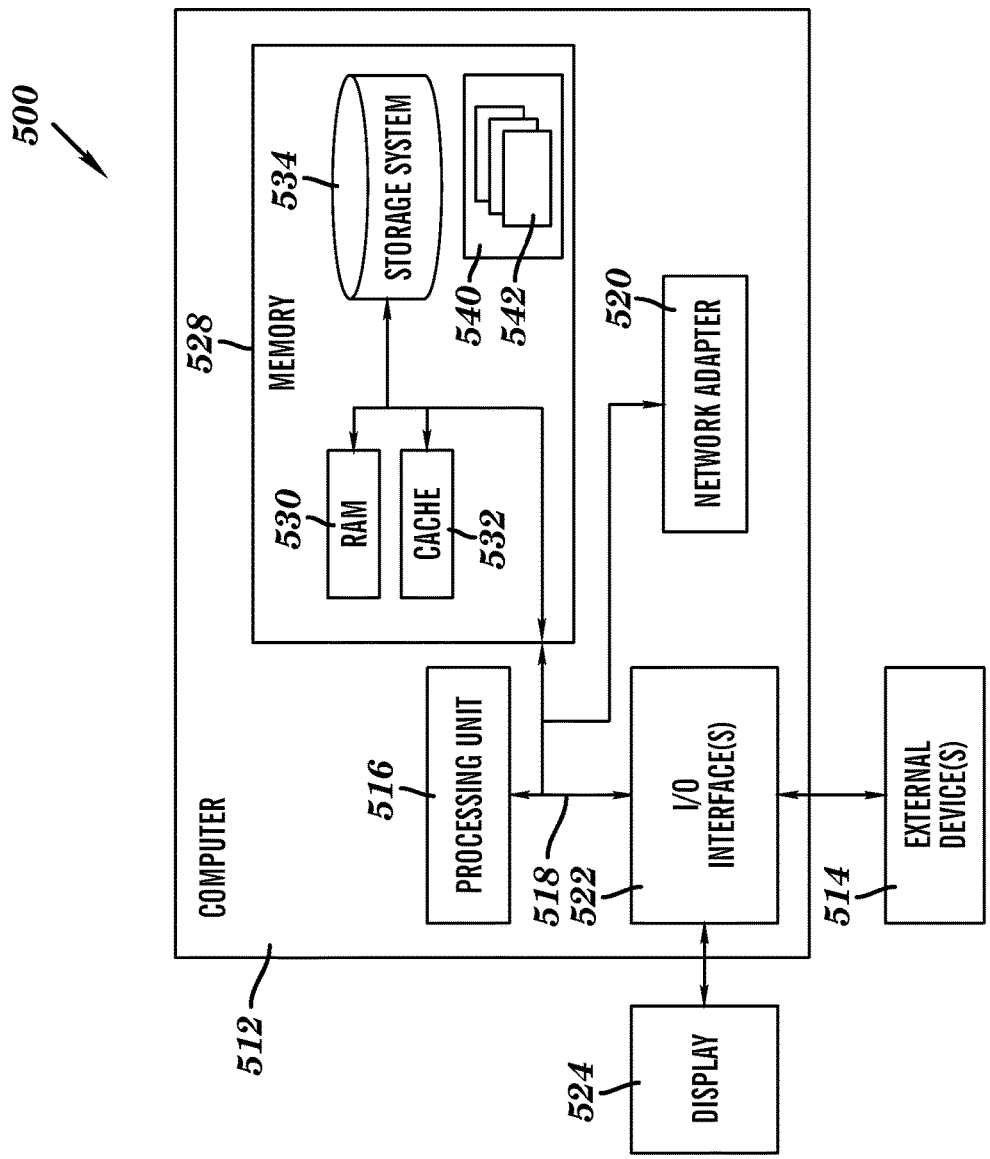
FIG. 5 illustrates a block diagram of components of a computer system, in accordance with embodiments of the present invention.

FIG. 5 is a functional block diagram of a computer system, in accordance with an embodiment of the present invention.

Computer system 500 is only one example of a suitable computer system and is not intended to suggest any limitation as to the scope of use or functionality of embodiments of the invention described herein. Computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of administrator device 110, development scheduler enterprise system 112, test-analysis scheduler enterprise system 114, production scheduler enterprise system 116, and central enterprise system 105 can include or can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, I/O interface 522, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 includes computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Batch workload scheduler administrator program 111, enterprise promotion program 104, batch development verification program 107, test analysis program 108, and production enterprise program 109 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one of batch workload scheduler administrator program 111, enterprise promotion program 104, batch development verification program 107, test analysis program 108, and production enterprise program 109 are implemented as or are an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interfaces 522. Still yet, computer 512 communicates with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for batch code promotion between enterprise scheduling system environments has been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer-implemented method for batch code promotion between enterprise scheduling system environments, the method comprising the steps of:
   connecting, by one or more processors, a graphical interface of an entity to one or more enterprise scheduling environments for promoting changes of batch code of the entity between the one or more enterprise scheduling environments, the batch code is processed during a batch job, the batch job is a low priority job, wherein the low priority batch job is processed by the one or more enterprise scheduling environments;
   mapping, by the one or more processors, parameters to batch code fields of the batch code that changes between a first scheduling level of the one or more enterprise scheduling environments to a second scheduling level of the one or more enterprise scheduling environments to create a mapping table to the batch code fields that changes from the first scheduling level and the second scheduling level, wherein the parameters include at least one batch job scheduling object identification, wherein the scheduling object identification further includes a container for all low priority batch jobs, an identification of the batch code, and an identification of the network workstations of the one or more enterprises scheduling environments for promoting the batch code between the first scheduling level to the second scheduling level;
   generating a backup, in memory, of the mapping table to the batch code fields;
   in response to an action on the graphical interface to promote the changes of the batch code fields between the mapped parameters of the first scheduling level and the second scheduling level, assigning, by the one or more processors, identification to the changes of the batch code fields;
   in response to a request to promote the identified changes of the batch code fields, promoting, by the one or more processors, the requested identified changes from the first scheduling level to the second scheduling level using the mapped parameters of the first scheduling level and the second scheduling level; and
   correlating, by the one or more processors, the mapping table of changed batch code fields of the first scheduling level with the mapping table of changed batch code fields of the second scheduling level, wherein the correlated mapping table of the batch code fields that change between the first scheduling level and the second scheduling level includes metadata of batch code for each one of the first and the second scheduling levels, and wherein the metadata of the batch code for each one of the first and the second scheduling levels is identified for promoting changes of the batch code fields from first scheduling level to the second scheduling level, further includes the steps of:
   creating the batch job of batch code fields of the metadata during the change of the first scheduling level and the second scheduling level between the first and the second scheduling levels;
   verifying the created batch job of batch code fields of the metadata during the change of the first scheduling level and the second scheduling level between the first and the second scheduling levels;
   operating the verified batch job of batch code fields of the metadata during the change of the first scheduling level and the second scheduling level between the first and the second scheduling levels;
   generating a second mapping table based on the mapped parameters and the created, verified, and operated batch job of batch code fields; and
   promoting the operated batch job between the second scheduling level and a third scheduling level based on the second mapping table.

2. The computer-implemented method according to claim 1, wherein either of the first scheduling level or the second scheduling level is a development scheduling environment, a test scheduling environment, or a production scheduling environment of the one or more enterprise scheduling environments.

3. The computer-implemented method according to claim 2, wherein the batch code of the entity is analyzed and promoted between each one of the development scheduling environment, the test scheduling environment, or the production scheduling environment.

4. The computer-implemented method according to claim 1, wherein the response to an action step, further includes the step of:
   storing, by the one or more processors, metadata of the identified changes of the batch code fields, for retrieval and promotion of the identified batch code fields from the first scheduling environment to the second scheduling environment.

5. A computer system for batch code promotion between enterprise scheduling system environments, the computer system comprises:
   one or more processors, one or more computer-readable memories,
   one or more computer-readable tangible storage devices and program instructions which are stored on at least one of the one or more storage devices for execution by at least one of the one or more processors via at least one of the one or more memories, the program instructions comprising:
   program instructions to connect a graphical interface of an entity to one or more enterprise scheduling environments for promoting changes of batch code of the entity between the one or more enterprise scheduling environments, the batch code is processed during a batch job, the batch job is a low priority job, wherein the low priority batch job is processed by the one or more enterprise scheduling environments;
   program instructions to map parameters to batch code fields of the batch code that changes between a first scheduling level of the one or more enterprise scheduling environments to a second scheduling level of the one or more enterprise scheduling environments to create a mapping table to the batch code fields that changes from the first scheduling level and the second scheduling level, wherein the parameters include at least one batch job scheduling object identification, wherein the scheduling object identification further includes a container for all low priority batch jobs, an identification of the batch code, and an identification of the network workstations of the one or more enterprises scheduling environments for promoting the batch code between the first scheduling level to the second scheduling level;

program instructions to generate a backup, in memory, of the mapping table to the batch code fields;

program instructions to assign identification to the changes of the batch code fields in response to an action on the graphical interface to promote the changes of the batch code fields between the mapped parameters of the first scheduling level and the second scheduling level;

program instructions to promote the requested identified changes from the first scheduling level to the second scheduling level using the mapped parameters of the first scheduling level and the second scheduling level in response to a request to promote the identified changes of the batch code fields; and program instructions to correlate, by the one or more processors, the mapping table of changed batch code fields of the first scheduling level with the mapping table of changed batch code fields of the second scheduling level, wherein the correlated mapping table of the batch code fields that change between the first scheduling level and the second scheduling level includes metadata of batch code for each one of the first and the second scheduling levels, and wherein the metadata of the batch code for each one of the first and the second scheduling levels is identified for promoting changes of the batch code fields from first scheduling level to the second scheduling level, further includes the steps of:

program instructions to create the batch job of batch code fields of the metadata during the change of the first scheduling level and the second scheduling level between the first and the second scheduling levels;

program instructions to verify the created batch job of batch code fields of the metadata during the change of the first scheduling level and the second scheduling level between the first and the second scheduling levels;

program instructions to operate the verified batch job of batch code fields of the metadata during the change of the first scheduling level and the second scheduling level between the first and the second scheduling levels;

program instructions to generate a second mapping table based on the mapped parameters and the operated batch job of batch code fields; and program instructions to promote the operated batch job between the second scheduling level and a third scheduling level based on the second mapping table.

6. The computer system according to claim 5, wherein either of the first scheduling level or the second scheduling level is a development scheduling environment, a test scheduling environment, or a production scheduling environment of the one or more enterprise scheduling environments.

7. The computer system according to claim 6, wherein the batch code of the entity is analyzed and promoted between each one of the development scheduling environment, the test scheduling environment, or the production scheduling environment.

8. The computer system according to claim 5, wherein program instructions to assign identification to the changes of the batch code fields in response to an action on the graphical interface to promote the changes of the batch code fields between the mapped parameters of the first scheduling level and the second scheduling level, further includes:

program instructions to store metadata of the identified changes of the batch code fields, for retrieval and promotion of the identified batch code fields from the first scheduling environment to the second scheduling environment.

9. A computer program product for batch code promotion between enterprise scheduling system environments, the computer program product comprising:

one or more non-transitory computer-readable tangible storage devices and program instructions stored on at least one of the one or more storage devices, the program instructions comprising:

program instructions to connect a graphical interface of an entity to one or more enterprise scheduling environments for promoting changes of batch code of the entity between the one or more enterprise scheduling environments, the batch code is processed during a batch job, the batch job is a low priority job, wherein the low priority batch job is processed by the one or more enterprise scheduling environments;

program instructions to map parameters to batch code fields of the batch code that changes between a first scheduling level of the one or more enterprise scheduling environments to a second scheduling level of the one or more enterprise scheduling environments to create a mapping table to the batch code fields that changes from the first scheduling level and the second scheduling level, wherein the parameters include at least one batch job scheduling object identification, wherein the scheduling object identification further includes a container for all low priority batch jobs, an identification of the batch code, and an identification of the network workstations of the one or more enterprises scheduling environments for promoting the batch code between the first scheduling level to the second scheduling level;

program instructions to generate a backup, in memory, of the mapping table to the batch code fields;

program instructions to assign identification to the changes of the batch code fields in response to an action on the graphical interface to promote the changes of the batch code fields between the mapped parameters of the first scheduling level and the second scheduling level;

program instructions to promote the requested identified changes from the first scheduling level to the second scheduling level using the mapped parameters of the first scheduling level and the second scheduling level in response to a request to promote the identified changes of the batch code fields; and program instructions to correlate, by the one or more processors, the mapping table of changed batch code fields of the first scheduling level with the mapping table of changed batch code fields of the second scheduling level, wherein the correlated mapping table of the batch code fields that change between the first scheduling level and the second scheduling level includes metadata of batch code for each one of the first and the second scheduling levels, and wherein the metadata of the batch code for each one of the first and the second scheduling levels is identified for promoting changes of the batch code fields from first scheduling level to the second scheduling level, further includes the steps of:

program instructions to create the batch job of batch code fields of the metadata during the change of the first scheduling level and the second scheduling level between the first and the second scheduling levels;

program instructions to verify the batch job of batch code fields of the metadata during the change of the first scheduling level and the second scheduling level between the first and the second scheduling levels;

program instructions to operate the batch job of batch code fields of the metadata during the change of the first scheduling level and the second scheduling level between the first and the second scheduling levels;

program instructions to generate a second mapping table based on the mapped parameters and the operated batch job of batch code fields; and program instructions to promote the operated batch job between the second scheduling level and a third scheduling level based on the second mapping table.

10. The computer program product according to claim 9, wherein either of the first scheduling level or the second scheduling level is a development scheduling environment, a test scheduling environment, or a production scheduling environment of the one or more enterprise scheduling environments.

11. The computer program product according to claim 10, wherein the batch code of the entity is analyzed and promoted between each one of the development scheduling environment, the test scheduling environment, or the production scheduling environment.

12. The computer program product according to claim 9, wherein program instructions to assign identification to the changes of the batch code fields in response to an action on the graphical interface to promote the changes of the batch code fields between the mapped parameters of the first scheduling level and the second scheduling level, further includes: program instructions to store metadata of the identified changes of the batch code fields, for retrieval and promotion of the identified batch code fields from the first scheduling environment to the second scheduling environment.

* * * * *